(12) United States Patent
Li

(10) Patent No.: US 8,938,228 B2
(45) Date of Patent: Jan. 20, 2015

(54) METHOD, APPARATUS AND SYSTEM FOR PERFORMING HANDOVER IN AN OVERLAPPING NETWORK ENVIRONMENT

(75) Inventor: Feng Li, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 13/514,676

(22) PCT Filed: Dec. 10, 2010

(86) PCT No.: PCT/KR2010/008836
§ 371 (c)(1),
(2), (4) Date: Jun. 8, 2012

(87) PCT Pub. No.: WO2011/071332
PCT Pub. Date: Jun. 16, 2011

(65) Prior Publication Data
US 2012/0315908 A1 Dec. 13, 2012

(30) Foreign Application Priority Data
Dec. 10, 2009 (KR) .................. 10-2009-0122497

(51) Int. Cl.
*H04W 4/00* (2009.01)
*H04W 36/00* (2009.01)
*H04W 36/04* (2009.01)
*H04W 84/04* (2009.01)

(52) U.S. Cl.
CPC .......... *H04W 36/0083* (2013.01); *H04W 36/04* (2013.01); *H04W 84/045* (2013.01)
USPC ......... 455/422.1; 455/436; 455/438; 370/331

(58) Field of Classification Search
USPC ........ 455/422.1, 436, 444, 435.1, 67.14, 450, 455/501, 63.1, 403, 434, 438; 370/331, 370/252, 332, 330, 329, 350
See application file for complete search history.

(56) References Cited

U.S. PATENT DOCUMENTS

| | | | |
|---|---|---|---|
| 7,724,707 B2 * | 5/2010 | Foster et al. .................. | 370/331 |
| 2007/0213067 A1 * | 9/2007 | Li et al. ......................... | 455/444 |
| 2008/0132239 A1 * | 6/2008 | Khetawat et al. ............. | 455/438 |
| 2009/0186615 A1 * | 7/2009 | Kwon et al. ................... | 455/436 |
| 2009/0215452 A1 * | 8/2009 | Balasubramanian et al. | 455/434 |
| 2009/0264077 A1 * | 10/2009 | Damnjanovic ............... | 455/63.1 |
| 2009/0275326 A1 * | 11/2009 | Lee et al. ..................... | 455/422.1 |
| 2010/0054237 A1 * | 3/2010 | Han et al. ..................... | 370/350 |
| 2010/0056145 A1 * | 3/2010 | Hashimoto et al. ......... | 455/435.2 |
| 2010/0075698 A1 * | 3/2010 | Rune et al. .................... | 455/458 |
| 2010/0111042 A1 * | 5/2010 | Chou et al. .................... | 370/332 |
| 2010/0120438 A1 * | 5/2010 | Kone et al. .................... | 455/444 |
| 2010/0124179 A1 * | 5/2010 | Lee et al. ...................... | 370/252 |
| 2010/0291934 A1 * | 11/2010 | Lopes ........................... | 455/446 |
| 2010/0311407 A1 * | 12/2010 | Yao et al. ...................... | 455/422.1 |

FOREIGN PATENT DOCUMENTS

KR 10-2009-0115030 A 11/2009

* cited by examiner

*Primary Examiner* — Mahendra Patel
(74) *Attorney, Agent, or Firm* — Jefferson IP Law, LLP

(57) ABSTRACT

The present invention relates to a method, apparatus and system for performing a handover in an overlapping network environment. Particularly, the present invention provides a method for performing a handover when a user terminal enters a femtocell from a macrocell. According to a preferred embodiment, a femtocell in which there is confusion caused by an allocation of a duplicate PCID is discriminated to perform a handover in an efficient manner when the user terminal moves from the macrocell to the femtocell.

18 Claims, 3 Drawing Sheets

METHOD, APPARATUS AND SYSTEM FOR PERFORMING HANDOVER IN AN OVERLAPPING NETWORK ENVIRONMENT

TECHNICAL FIELD

The present invention relates to a handover in a wireless communication system, and more particularly to a method, an apparatus, and a system for performing an inbound handover to a femtocell from a macrocell.

BACKGROUND ART

In a cellular wireless communication system, when a channel condition is degraded due to a geographical factor within a cell, a distance between a terminal and a base station, and a movement of a terminal, a failure of the smooth communication between the terminal and the base station may be generated. For example, within a closed building, such as an office and a house, a radio wave shadow area is created and a base station cannot perform the smooth communication with a terminal located in the radio wave shadow area.

Accordingly, the wireless communication system provides a femtocell service for providing high-speed data service while solving a service problem in a radio wave shadow area. The femtocell means an area of a cell relatively smaller than the macrocell and is formed by a femto base station installed in a region desired by a user. That is, the femtocell is a micro mobile communication base station accessing a mobile communication core network through a broadband network installed inside a building, such as a house and an office. The femtocell is a compound word of a "femto" meaning 10-15 and a "cell" meaning a coverage area of a mobile phone, and means a base station capable of providing a coverage area of a cell less than 10 m in radius.

In the meantime, the femtocell adopts a concept of a Closed Subscriber Group (CSG). Accordingly, the femtocell makes a control such that only a CSG can access thereto. The femtocell is generally operated in a CSG mode and provides services only to terminals included in the CSG. The femtocell operated in the CSG mode is referred to as a CSG cell hereinafter.

In order for user equipment to enter the CSG cell, the femtocell performs a control of an access. To this end, the user equipment is required to have a list of CSG cell identifications, i.e. an allowed CSG List (ACL) of the user equipment, which corresponds to CSG cells the user equipment has a right to access.

In the meantime, a handover, which is one of the most remarkable characteristics of the wireless communication system using a cellular network, is required in order to secure a mobility of the user equipment. Since a plurality of femtocells may be installed within one macrocell area, the handover is performed when the user equipment moves between the macrocell and the femtocell. The entrance of the user equipment to the femtocell from the macrocell is referred to as an inbound handover, and the entrance of the user equipment to the macrocell from the femtocell is referred to as an outbound handover.

Contrary to the outbound handover, in a case of the inbound handover, a network identifies if the user equipment belongs to the femtocell, i.e. a CSG of a CSG cell. Only when the user equipment belongs to the CSG of the CSG cell, the network may initiate a handover preparation procedure. That is, before the performance of the handover to the CSG cell, the network should perform a control of an access of the user equipment.

A specific method of performing an inbound handover by the user equipment has not been currently defined. Accordingly, a method of efficiently performing the inbound handover by a user equipment has been demanded.

DISCLOSURE

Technical Problem

Accordingly, the present invention has been made to solve the above-mentioned problems occurring in the prior art, and the present invention provides a method, an apparatus, and a system for performing a handover by identifying a femtocell in which confusion is caused due to duplicate PCIDs when a user equipment moves to a femtocell from a macrocell.

Technical Solution

In accordance with an aspect of the present invention, there is provided a method of performing an inbound handover by a macro base station for supporting a communication service for a macrocell in a mobile network which is configured by the macrocell and a plurality of femtocells within the macrocell and has an identically shared Physical Cell IDentification (PCID) assigned to two or more femtocells among the plurality of femtocells, the method including: when a PCID provided for the inbound handover from a user equipment is the shared PCID, receiving additional information from the user equipment and determining one of the two or more femtocells to which the shared PCID is assigned as a destination femtocell; and performing a procedure of the inbound handover for an access of the user equipment to the destination femtocell.

In accordance with another aspect of the present invention, there is provided a method of performing an access control for performing an inbound handover by a mobility management entity in a mobile network which is configured by a macrocell and a plurality of femtocells within the macrocell and has an identically shared PCID assigned to two or more femtocells among the plurality of femtocells, the method including: when the mobility management entity receives a handover request message from a macro base station supporting a communication service for the macrocell, examining whether the mobility management entity has an allowed Closed Subscriber Group (CSG) list of a user equipment and a CSG identification of a destination femtocell; when the mobility management entity does not have the allowed CSG list of the user equipment, obtaining the allowed CSG list from a home subscriber list; when the mobility management entity does not have the CSG identification of the destination femtocell, obtaining the CSG identification from a destination femto base station; when the mobility management entity obtains the allowed CSG list and the CSG identification, identifying whether the CSG identification of the destination femtocell is contained in the allowed CSG list of the user equipment; and transmitting a handover failure message or a handover instruction message according to a result of the identification to the macro base station.

In accordance with another aspect of the present invention, there is provided a system for performing an inbound handover by a macro base station for supporting a communication service for a macrocell in a mobile network which is configured by the macrocell and a plurality of femtocells within the macrocell and has an identically shared PCID assigned to two or more femtocells among the plurality of femtocells, wherein when a PCID provided for the inbound handover from a user equipment is the shared PCID, the macro base station receives additional information from the user equipment and determines one of the two or more femtocells to which the shared PCID is assigned as a destination femtocell and performs a procedure of the inbound handover for an access of the user equipment to the destination femtocell.

In accordance with another aspect of the present invention, there is provided a system for performing an access control for performing an inbound handover by a mobility management entity in a mobile network which is configured by a macrocell and a plurality of femtocells within the macrocell and has an identically shared PCID assigned to two or more femtocells among the plurality of femtocells, wherein when the mobility management entity receives a handover request message from a macro base station supporting a communication service for the macrocell, the mobility management entity examines whether the mobility management entity has an allowed CSG list of a user equipment and a CSG identification of a destination femtocell obtains the allowed CSG list from a home subscriber list when the mobility management entity does not have the allowed CSG list of the user equipment, obtains the CSG identification from a destination femto base station when the mobility management entity does not have the CSG identification of the destination femtocell, identifies whether the CSG identification of the destination femtocell is contained in the allowed CSG list of the user equipment when the mobility management entity obtains the allowed CSG list and the CSG identification, and then transmits a handover failure message or a handover instruction message according to a result of the identification to the macro base station.

In accordance with another aspect of the present invention, there is provided a user equipment capable of performing an inbound handover in a mobile network which is configured by a macrocell and a plurality of femtocells within the macrocell and has an identically shared PCID assigned to two or more femtocells among the plurality of femtocells, the user equipment receiving a message containing a measurement gap used for obtaining system information on a destination femtocell from a macro base station, obtaining the system information on the destination femtocell by using the measurement gap, and then transmitting a measurement report message containing preliminary access control information indicating allowance or non-allowance of the access to the destination femtocell based on the obtained system information to the macro base station.

In accordance with another aspect of the present invention, there is provided a method of performing an inbound handover by a user equipment in a mobile network which is configured by a macrocell and a plurality of femtocells within the macrocell and has an identically shared PCID assigned to two or more femtocells among the plurality of femtocells, the method including: receiving a message containing a measurement gap used for obtaining system information on a destination femtocell from a macro base station; obtaining the system information on the destination femtocell by using the measurement gap; and transmitting a measurement report message containing preliminary access control information indicating allowance or non-allowance of the access to the destination femtocell based on the obtained system information to the macro base station.

Advantageous Effects

Accordingly, the present invention has an effect of efficiently performing a handover by identifying a femtocell in which confusion is caused by duplicate PCIDs when a user equipment moves to a femtocell from a macrocell.

BEST MODE

Mode for Invention

In the following description, detailed explanation of known related functions and constitutions may be omitted so as to avoid unnecessarily obscuring the subject manner of the present invention. Further, the terms used in the description are defined considering the functions of the present invention and may vary depending on the intention or usual practice of a user or operator. Therefore, the definitions should be made based on the entire contents of the description.

The present invention according to an embodiment provides a method, an apparatus, and a system for performing handover when a User Equipment (UE) moves to a femtocell from a macrocell.

Hereinafter, an exemplary embodiment of the present invention will be described with reference to drawings in detail.

Figure 1:
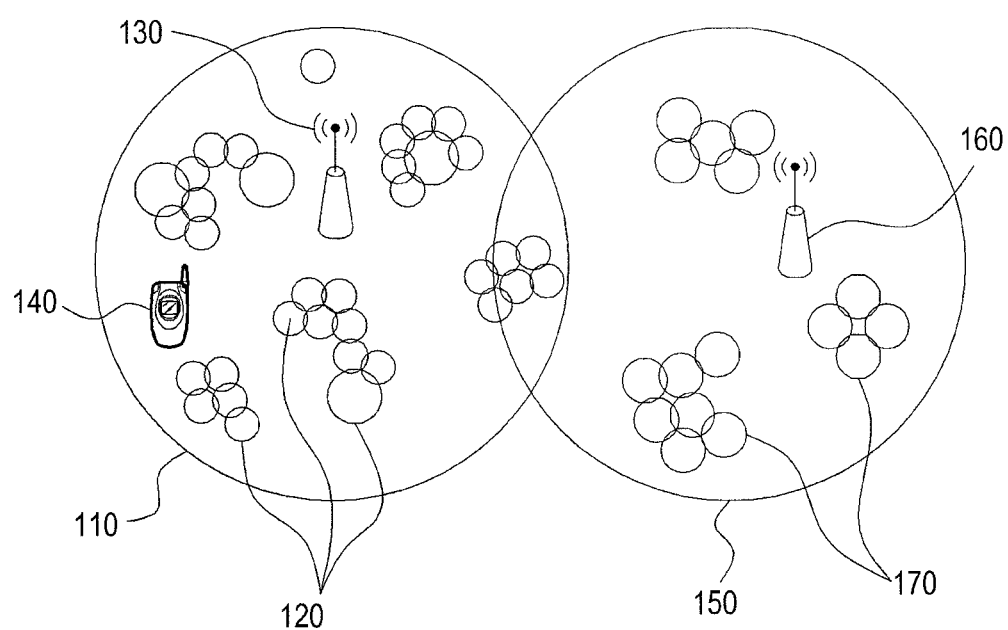
FIG. 1 is a diagram illustrating a mobile communication system according to an embodiment of the present invention.

FIG. 1 illustrates a mobile communication system to which an embodiment of the present invention is applied.

Referring to FIG. 1, the mobile communication system includes macrocells 110 and 150 formed by macro base stations 130 and 160 and a plurality of femtocells 120 and 170 installed within the macrocells 110 and 150. Hereinafter, the present invention will be described based on the macro base station 130 and the macrocell 110 for convenience's sake.

In the mobile communication system considering the femtocell, a plurality of femtocells 120 may be located or newly installed within an area of the macrocell 110 formed by the macro base station 130. In this case, in order to support the inbound handover to the plurality of femtocells 120, the macro base station 130 is required to register the femtocell 120, to which the inbound handover may be performed, to a neighbor list. However, the number of registered femtocells 120 may not maximally exceed 32 in this case.

The macro base station 130 controlling the macrocell 110 allocates one Physical Cell Identification (PCID) to respective femto base stations located in its service coverage. However, since the number of PCIDs allocatable to the femto base stations by the macro base station is limited, when there are femto base stations in a number larger than the number of PCIDs allocatable to the femto base stations by the macro base station, the macro base station duplicately allocates the PCID to the femto base stations. Accordingly, the same PCID may be allocated to the plurality of femtocells 120 located within the macrocell 110. Accordingly, when a corresponding PCID included in a measurement report message received from the UE 140 is a duplicately allocated PCID, the macro base station 130 is required to be able to determine an accurate destination femtocell.

In the meantime, when the femtocell 120 is operated in the CSG mode, an access control method should be established in order for the user equipment to perform the inbound handover. Currently, a user equipment-based access control and a network-based access control have been discussed.

In order to remove an attempt to perform the handover to a CSG cell which is not included in the ACL of the user equipment, the user equipment needs to perform a preliminary control for an access to a designation CSG cell. Accordingly, only when a cell reported by the user equipment corresponds to the allowed CSG cell, the network may initiate the preparation procedure for the handover to the reported CSG cell. However, the network is also required to directly perform the control of the access of the user equipment to the designation CSG cell.

Accordingly, a novel method of performing an inbound handover which removes confusion of the PCID and considers the control of the access will be described in the embodiment of the present invention below.

Figure 2:
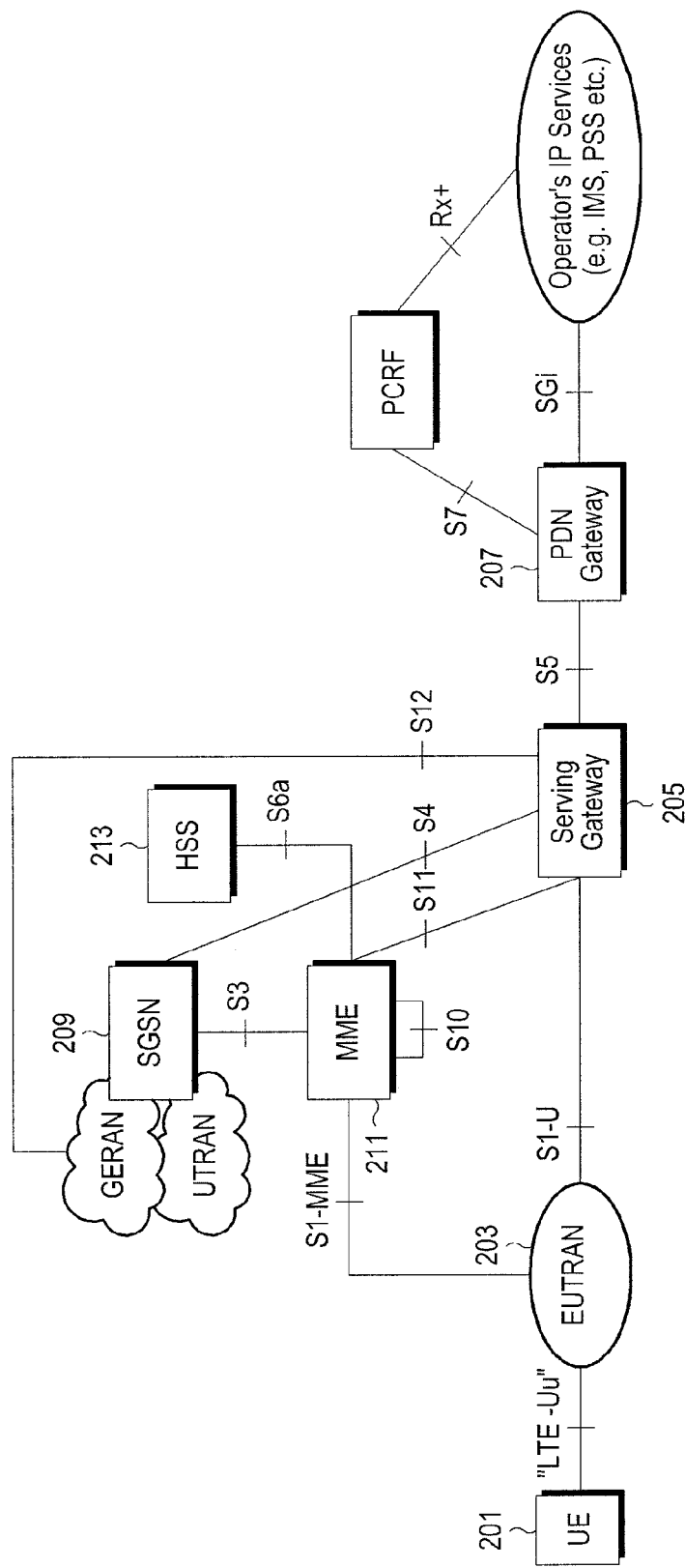
FIG. 2 is a diagram illustrating an SAE according to an embodiment of the present invention.

FIG. 2 illustrates a System Architecture Evolution (SAE) architecture that is an enhanced packet system currently progressed in the 3GPP to implement the exemplary embodiment of the present invention.

Referring to FIG. 2, the SAE includes an UE 201, an Enhanced UTRAN (E-UTRAN) 203, a Mobility management Entity (Node) (MME) 211, a Serving GateWay (SGW) 205, a Packet or Public Data Network (PDN) GateWay (PGW) 207, a Serving General Packet Radio Service (GPRS) Support Node (SGSN) 209, and a Home Subscriber Server (HSS) 213. The detailed description of other elements of the SAE which are not directly related to the exemplary embodiment of the present invention will be omitted.

The E-UTRAN 203 is an enhanced access network and an enhanced Node B (eNB) (not shown) is included as an E-UTRAN entity. In the embodiment of the present invention, the eNB means a base station of the macrocell and a Home enhanced Node (HeNB) means a base station of the femtocell.

The MME 211 performs functions, such as a Non Access Stratum (NAS) signaling, an NAS signaling security, a mobility management between the 3GPP networks, a location management of an idle mode UE, a roaming, an authentication, and a barrier management.

The SGW 205 performs a mobility management between the eNBs, the mobility management between the 3GPP networks, an idle mode downlink packet buffering of a downlink in a E-UTRAN idle mode, a lawful interception, and a packet routing and forwarding. The PGW 207 performs functions including policy enforcement, per-user based packet filtering, charging support, lawful interception, UE IP allocation, and packet screening.

The SGSN 209 is an entity related to a legacy packet network (GPRS) and the HSS 213 manages user subscription information and location information. Those skilled in the art will appreciate that the aforementioned entities may have additional functions.

Figure 3:
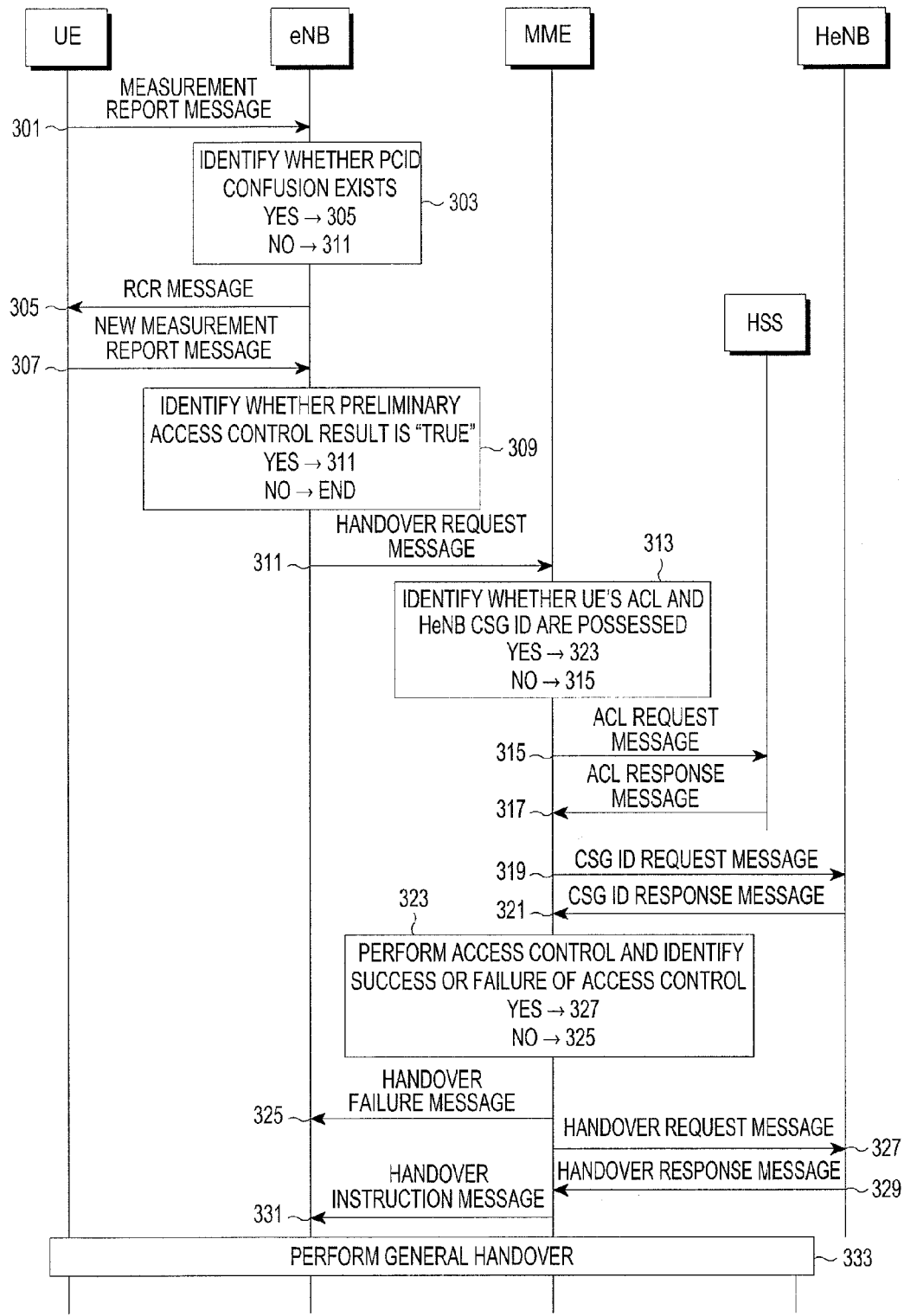
FIG. 3 is a flowchart illustrating a method of performing an inbound handover according to an embodiment of the present invention.

FIG. 3 illustrates a procedure for performing the inbound handover according to an exemplary embodiment of the present invention.

Referring to FIG. 3, the UE performs a scanning for neighboring cells for the handover within a frequency or between frequencies formed by the macro base station (eNB) that is a service base station. For example, as the UE enters a specific femtocell coverage area, the UE identifies whether a signal strength from the femto base station (HeNB) measured through the scanning is equal to or larger than a predetermined threshold. In this case, the predetermined threshold may be pre-set in order to determine a necessity of the handover. When there is a signal strength larger than the predetermined threshold, the UE transmits a measurement report message to the macro base station (step 301). The measurement report message includes a PCID of a destination femtocell to which the inbound handover of the UE may be performed. Here, the destination femtocell corresponds to a femtocell in which the signal strength higher than the predetermined threshold is measured.

In the meantime, the PCIDs for identifying the femtocell include a split, which may be used for identification of the CSG cell. That is, a group of some PCIDs among the entire PCIDs may be reserved for only the CSG cell. Accordingly, when the UE and the macro base station have information on the split of the PCID, the UE and the macro base station may identify whether a corresponding femtocell is the CSG cell through the PCID of the femtocell.

The macro base station examines the information on the PCID contained in the measurement report message received from the UE and then identifies whether PCID confusion exists (step 303).

When the PCID confusion does not exist, the macro base station proceeds to step 311 of performing a handover preparation procedure. Non-existence of the PCID confusion corresponds to a case in which the macro base station may identify the destination femtocell by using the PCID contained in the measurement report message. In this case, the control of the access of the UE may be performed by a core network, the detailed description of which will be described later.

In the meantime, when the macro base station is not able to identify the destination femtocell by using the PCID, the macro base station performs a procedure for identifying the destination femtocell (step 305 to step 309). To describe the procedure for identifying the destination femtocell, the macro base station sets a measurement gap. The measurement gap is information required for obtaining system information on the destination femtocell. The macro base station transmits a Radio Resource Control (RRC) Connection Reconfiguration message (RCR message) containing information (measurement gap parameters) on the measurement gap to the UE (step 305). Through this, the set measurement gap is allocated to the mobile terminal.

For example, the RCR message includes a "measConfig" field that is an information element. A "measGapConfig" field is present within the "measConfig" field. The "measGapConfig" field may include the measurement gap parameters.

The UE may obtain the system information on the destination femtocell by using the measurement gap parameters contained in the RCR message. Further, the UE may solve the PCID confusion by using the system information and perform a preliminary control of the access.

Hereinafter, a method of setting the measurement gap and allocating the set measurement gap to the UE by the macro base station will be described in detail.

The system information (or a system information message) transmitted by the base station is information commonly necessary within a cell and is used for the network access of the UE. The system information is configured with a scheduling block for generally controlling various system information, one Master Information Block (MIB) for information on a network, and a plurality of various System Information Blocks (SIBs). The system information is periodically transmitted to the UE by the base station and each SIB may be divided into multiple division blocks.

The UE receives the system information through a specific channel (e.g. a Broadcast Control Channel (BCCH)) from the network (e.g. the EUTRAN) controlling the cell to which the UE belongs. The UE obtains information necessary for an access to the network, in addition to core network information and network information, through the system information.

When the system information is transmitted to the UE, the MIB uses a fixed scheduling having a cycle of 40 ms and the system information is repetitively transmitted within 40 ms. The first transmission in the MIB is scheduled in sub frame 0 of wireless frames having the remainder "0" obtained by dividing a System Frame Number (SFN) by 4 (SFN mod 4=0), and the repetitive transmission is scheduled in sub frame 0 of all other wireless frames.

In the meantime, the SIB uses a fixed scheduling having a cycle of 80 ms and the repetitive transmission is performed within 80 ms. The first transmission in the SIB is scheduled in sub frame 5 of wireless frames having the remainder "0" obtained by dividing the SFN by 8 (SFN mod 8=0), and the repetitive transmission is scheduled in sub frame 5 of all other wireless frames having the remainder "0" obtained by dividing the SFN by 2 (SFN mod 2=0).

Accordingly, the measurement gap may be set based on transmission scheduling information of the MIB and the SIB as represented in Table 1 below.

TABLE 1

| Gap Pattern ID | Gap length | Gap Repetition Period | Start Subframe |
|---|---|---|---|
| 0 | 6 ms | 40 ms | subframe 0 of SFN mod 4 = 0 |
| 1 | 6 ms | 80 ms | subframe 5 of SFN mod 2 = 0 |

Referring to Table 1, the measurement gap parameter includes a gap pattern, a repetition period, a gap length, and a start sub frame. The measurement gap parameter is included in the RCR message and transmitted to the UE.

By obtaining the transmission scheduling information on the MIB and the SIB by setting the measurement gap, the UE may obtain the MIB and the SIB included in the system information on the destination femtocell.

As described above, through the allocation of the aforementioned measurement gap to the UE, the UE may obtain the system information on the destination femtocell. However, the measurement gap may give a negative influence to progressing voice calls and degrade a call communication quality. Accordingly, it is necessary to minimize the setting of the measurement gap.

The UE may obtain a Cell Global Identification (CGI), a Tracking Area Identification (TAI), and a Closed Subscriber Group Identification (CSG ID) of the destination femtocell by using the information on the MIB and the SIB.

The UE may solve the PCID confusion by providing the macro base station with CGI information or CGI information and TAI information. Further, the UE may perform the preliminary control of the access by using CSG ID information.

The UE configures a measurement report message and transmits the configured measurement report message to the macro base station (step 307). The measurement report message contains CGI and Pre-AC result information contrary to the measurement report message transmitted in step 301, and may further contain the TAI information.

A "Pre-AC result" that is a new Boolean-type information factor is added to a "MeasResult" field of the measurement report message in order to make a report of a result of the preliminary control of the access performed by the UE to the macro base station. When the CSG ID of the destination femtocell is included in the ACL of the UE, the "Pre-AC result" is set to "TRUE" because the UE is able to access the destination femtocell. However, when the CSG ID of the destination femtocell is not included in the ACL of the UE, the "Pre-AC result" is set to "FALSE" because the UE is not able to access the destination femtocell.

The UE performs the preliminary control of the access even though the core network to be described performs the control of the access because the unnecessary signaling overhead may be reduced by initiating the handover preparation procedure according to the result of the preliminary control of the access of the UE by the macro base station.

When the macro base station receives the measurement report message from the UE, the macro base station releases the setting of the measurement gap used for the obtaining the system information. Then, the macro base station fetches "pre-AC result" information contained in the measurement report message and identifies the result of the preliminary control of the access of the UE (step 309). When the result of the preliminary control of the access is "TRUE", the macro base station proceeds to step 311 of initiating the handover preparation procedure. However, when the result of the preliminary control of the access is "FALSE", the macro base station terminates the handover preparation procedure.

The macro base station transmits a handover request message to the MME in order to initiate the handover preparation procedure (step 311). The handover request message contains the information on the destination femtocell. The destination femtocell may be identified through the CGI reported by the UE.

When the MME receives the handover request message from the macro base station, the MME performs the control of the access of the UE for the destination femtocell. Although the UE performs the preliminary control of the access, the MME performs the control of the access again because the UE may report an incorrect "pre-AC result". Hereinafter, the control of the access of the UE performed by the MME will be described in detail.

The MME determines an International Mobile Subscriber Identify (IMSI) of the UE and a destination femtocell ID (HeNB ID) by using the handover request message received from the macro base station. The MME may determine the HeNB ID through a "Target ID" field within the handover request message. In the meantime, the IMSI of the UE is pre-stored in the MME.

Then, the MME identifies whether the ACL of the UE and the CSG ID of the destination femtocell are included in its database (step 313). When the MME has the ACL and the CSG ID of the destination femtocell, the MME performs the control of the access of the UE (step 323). However, when the MME does not have the ACL of the UE and the CSG ID of the destination femtocell, the MME performs the operations of steps 315 to 321.

First, when the MME does not have the ACL of the UE, the MME transmits an ACL request message to the HSS in order to obtain the ACL of the UE (step 315). The ACL request message includes the IMSI of the UE.

The HSS responds to the ACL request message and transmits an ACL response message to the MME (step 317). The HSS may identify the ACL of the corresponding UE by using the IMSI of the UE contained in the ACL request message. Accordingly, the HSS inserts the ACL of the corresponding UE to the ACL response message and transmits the ACL response message to the MME.

When the MME does not have the CSG ID of the destination femtocell, the MME transmits a CGI ID request message to the femto base station (HeNB) in order to obtain the CSG ID of the destination femtocell (step 319). The CGI ID request message includes the HeNB ID.

The femto base station responds to the CSG ID request message and transmits a CSG response message to the MME (Step 321). The femto base station may identify the CSG ID of the corresponding destination femtocell by using the HeNB ID contained in the CSG ID request message. Accordingly, the femto base station inserts the CSG ID of the corresponding destination femtocell in the CSG ID response message and transmits the CSG ID response message to the MME.

When the MME obtains the ACL of the UE and the CSG ID of the destination femtocell from the HSS and the femto base station, the MME performs the control of the access of the UE.

That is, the MME may determine whether the UE is allowed to access the destination femtocell by identifying whether the CSG ID is included in the ACL of the UE. Through the aforementioned process, the MME may perform the control of the access of the UE.

As a result of the control of the access, when the UE is able to access the destination femtocell, the MME continuously performs the handover procedure (steps 327, 329, and 331). However, when the UE is not able to access the destination femtocell, the MME transmits a handover failure message to the macro base station (Step 325). The macro base station receiving the handover failure message terminates the handover preparation.

Specifically, the MME transmits the handover request message to the femto base station (step 327). The femto base station responds to the handover request message and transmits the handover response message to the MME (step 329).

When the MME receives the handover response message, the MME transmits a handover instruction message to the macro base station (step 331). The macro base station receives the handover instruction message and then performs the general handover procedure (step 333).

Accordingly, the novel method of performing the handover in a case of the entrance of the UE to the femtocell from the macrocell may be defined through the aforementioned process. That is, the method of performing the handover may solve the existing PCID confusion and newly define a signaling for the control of the access of the UE and the preparation of the handover.

The foregoing is a description of the exemplary embodiment of the present invention, but it will be readily understood by those skilled in the art that various modifications and changes can be made thereto within the technical spirit and scope of the present invention. Thus, the scope of the present invention is not limited to the aforementioned embodiment and shall be defined by the appended claims and those equivalents.

The invention claimed is:

1. A method of performing an inbound handover by a macro base station for supporting a communication service for a macrocell in a mobile network which is configured by the macrocell and a plurality of femtocells within the macrocell, the method comprising:
   assigning identically shared Physical Cell IDentification (PCID) to two or more femtocells among the plurality of femtocells;
   when a PCID provided for the inbound handover from a user equipment is the shared PCID, receiving access allowance identification information from the user equipment and determining according to the access allowance identification information one of the two or more femtocells to which the shared PCID is assigned as a destination femtocell; and
   performing a procedure of the inbound handover for an access of the user equipment to the destination femtocell.

2. The method as claimed in claim 1, wherein determining of the one of the two or more femtocells to which the shared PCID is assigned as the destination femtocell comprises:
   receiving a measurement report message from the user equipment;
   when a PCID included in the measurement report message is the shared PCID, receiving preliminary access control information from the user equipment; and
   designating one of the two or more femtocells as the destination femtocell according to the received preliminary access control information.

3. The method as claimed in claim 2, wherein receiving of the preliminary access control information comprises:
   transmitting a measurement gap necessary for the user equipment to obtain system information on the destination femtocell to the user equipment; and
   receiving a new measurement report message containing a Cell Global Identification (CGI) and the access allowance identification information obtained using the measurement gap from the user equipment.

4. The method as claimed in claim 3, wherein the new measurement report message further contains a Tracking Area Identification (TAI).

5. The method as claimed in claim 3, wherein designating of the one of the two or more femtocells as the destination femtocell comprises identifying whether the user equipment is allowed to access the destination femtocell according to the access allowance identification information and designating one femtocell selected by the CGI among the two or more femtocells as the destination femtocell.

6. The method as claimed in claim 3, wherein performing of the procedure of the inbound handover comprises:
   transmitting a handover request message containing destination femtocell information corresponding to the CGI contained in the preliminary access control information to a mobility management entity;
   receiving a handover failure message or a handover instruction message as a response to the handover request message; and
   when the handover instruction message is received, performing the inbound handover.

7. A method of performing an access control for performing an inbound handover by a mobility management entity in a mobile network which is configured by a macrocell and a plurality of femtocells within the macrocell, the method comprising:
   assigning an identically shared PCID to two or more femtocells among the plurality of femtocells;
   when the mobility management entity receives a handover request message from a macro base station supporting a communication service for the macrocell, examining whether the mobility management entity has an allowed Closed Subscriber Group (CSG) list of a user equipment and a CSG identification of a destination femtocell;
   when the mobility management entity does not have the allowed CSG list of the user equipment, obtaining the allowed CSG list from a home subscriber list;
   when the mobility management entity does not have the CSG identification of the destination femtocell, obtaining the CSG identification from a destination femto base station;
   when the mobility management entity obtains the allowed CSG list and the CSG identification, identifying whether the CSG identification of the destination femtocell is contained in the allowed CSG list of the user equipment; and transmitting a handover failure message or a handover instruction message according to a result of the identification to the macro base station.

8. The method as claimed in claim 7, wherein obtaining of the allowed CSG list comprises:

transmitting an allowed CSG list request message containing an International Mobile Subscriber Identity (IMSI) of the UE to the home subscriber server; and receiving an allowed CSG list response message containing an allowed CSG list corresponding to the IMSI from the home subscriber server.

9. The method as claimed in claim 7, wherein obtaining of the CSG identification comprises:

transmitting a CSG identification request message containing an identification of the destination femtocell to the femto base station; and receiving a CSG identification response message containing a CSG identification corresponding to the identification of the destination femtocell from the femto base station.

10. A system for performing an inbound handover by a macro base station for supporting a communication service for a macrocell in a mobile network which is configured by the macrocell and a plurality of femtocells within the macrocell, the system comprising:

an identically shared PCID is assigned to two or more femtocells among the plurality of femtocells, wherein when a PCID provided for the inbound handover from a user equipment is the shared PCID, the macro base station receives access allowance identification information from the user equipment and determines according to the access allowance identification information one of the two or more femtocells to which the shared PCID is assigned as a destination femtocell and performs a procedure of the inbound handover for an access of the user equipment to the destination femtocell.

11. The system as claimed in claim 10, wherein the macro base station receives a measurement report message from the user equipment, receives preliminary access control information from the user equipment when a PCID contained in the measurement report message is the shared PCID, and then designates one of the two or more femtocells as the destination femtocell according to the received preliminary access control information.

12. The system as claimed in claim 11, wherein the macro base station transmits a measurement gap necessary for the user equipment to obtain system information on the destination femtocell to the user equipment, and receives a new measurement report message containing a CGI and the access allowance identification information obtained using the measurement gap from the user equipment.

13. The system as claimed in claim 12, wherein the new measurement report message further contains a TAI.

14. The system as claimed in claim 12, wherein the macro base station identifies whether an access of the user equipment to the destination femtocell is allowed based on the access allowance identification information and designates one femtocell selected by the CGI among the two or more femtocells as the destination femtocell.

15. The system as claimed in claim 12, wherein the macro base station transmits a handover request message containing destination femtocell information corresponding to the CGI contained in the preliminary access control information to a mobility management entity, receives a handover failure message or a handover instruction message as a response to the handover request message, and then performs the inbound handover.

16. A system for performing an access control for performing an inbound handover by a mobility management entity in a mobile network which is configured by a macrocell and a plurality of femtocells within the macrocell, the system comprising:

an identically shared PCID is assigned to two or more femtocells among the plurality of femtocells, wherein when the mobility management entity receives a handover request message from a macro base station supporting a communication service for the macrocell, the mobility management entity examines whether the mobility management entity has an allowed CSG list of a user equipment and a CSG identification of a destination femtocell obtains the allowed CSG list from a home subscriber list when the mobility management entity does not have the allowed CSG list of the user equipment, obtains the CSG identification from a destination femto base station when the mobility management entity does not have the CSG identification of the destination femtocell, identifies whether the CSG identification of the destination femtocell is contained in the allowed CSG list of the user equipment when the mobility management entity obtains the allowed CSG list and the CSG identification, and then transmits a handover failure message or a handover instruction message according to a result of the identification to the macro base station.

17. The system as claimed in claim 16, wherein the mobility management entity transmits an allowed CSG list request message containing an IMSI of the user equipment to the home subscriber server, and receives an allowed CSG list response message containing an allowed CSG list corresponding to the IMSI from the home subscriber server.

18. The system as claimed in claim 16, wherein the mobility management entity transmits a CSG identification request message containing an identification of the destination femtocell to the femto base station and receives a CSG identification response message containing a CSG identification corresponding to the identification of the destination femtocell from the femto base station.

* * * * *